Oct. 21, 1947.　　　　G. E. KLINE　　　　2,429,268
MACHINE FOR PREFORMING PLASTIC COMPOUNDS
Filed Aug. 31, 1943　　　4 Sheets-Sheet 1

INVENTOR.
GLEN E. KLINE
BY
Edward M. Apple
ATTORNEY

Oct. 21, 1947.  G. E. KLINE  2,429,268
MACHINE FOR PREFORMING PLASTIC COMPOUNDS
Filed Aug. 31, 1943  4 Sheets-Sheet 2

INVENTOR.
GLEN E. KLINE
BY
Edward M. Apple
ATTORNEY

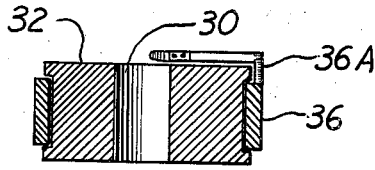
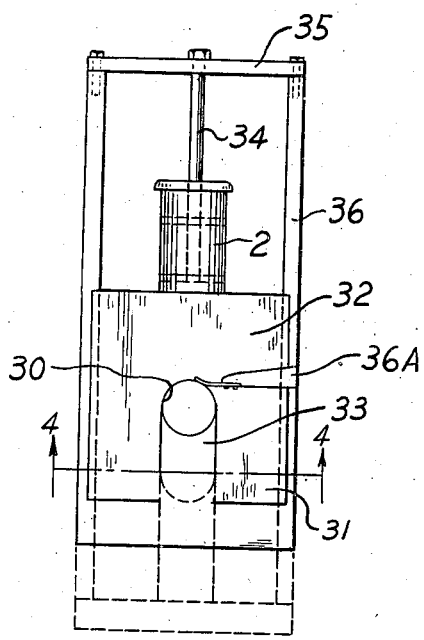
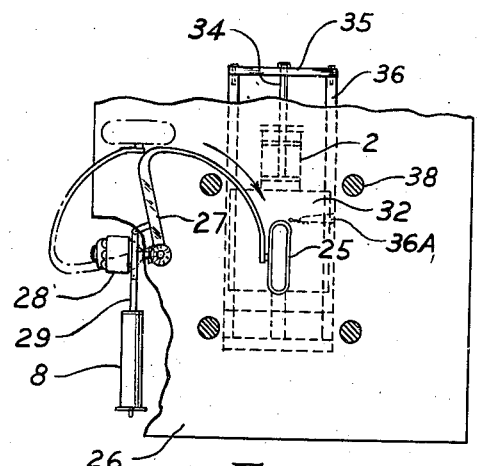
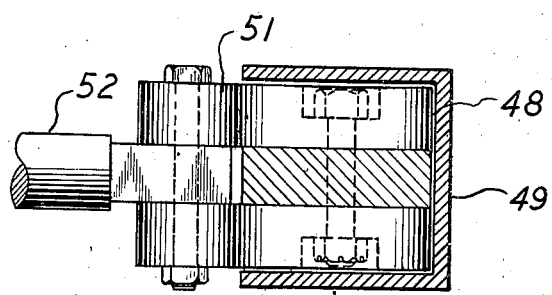

INVENTOR.
GLEN F. KLINE
BY Edward M. Apple
ATTORNEY

Patented Oct. 21, 1947

2,429,268

UNITED STATES PATENT OFFICE 2,429,268

MACHINE FOR PREFORMING PLASTIC COMPOUNDS

Glen E. Kline, Royal Oak, Mich., assignor of sixty-five one-hundredths to Benjamin R. Rowen, Flint, Mich.

Application August 31, 1943, Serial No. 500,661

7 Claims. (Cl. 18—16)

This invention relates to the plastic molding art and has particular reference to apparatus for pre-forming high bulk factor molding compounds into compact form for more efficient handling.

The use of electro-static heat in molding plastic compounds is fast coming to the fore. Heat generated electro-statically makes possible the molding of articles many times the size and thickness of moldings now made with ordinary heating methods.

In order to efficiently use electro-static heat for molding purposes it is necessary to pre-form the molding compounds. Pre-forming serves the purpose of increasing the density of the compound, thereby improving its electro-static capacity. Molding pre-formed compounds also permits the electro-static plates to be positioned closer together, which results in more efficient heating. It also insures a uniformly parallel plate position, which is an important factor in electro-static heating.

Heretofore pre-forming of molding compounds has been confined to manual operation exclusively insofar as applicant's knowledge is concerned. Particularly has this been true with compounds of a high bulk factor.

The principal reason why high-impact molding compounds have not had wider use is because of the physical nature of the materials themselves. In order to produce a very high impact molding compound, a macerated fabric is generally used as a filler. This may be cotton cloth, chopped canvas or other material. When prepared for use with the resin, or other plastic material, the resulting molding compound is very bulky and remains so even after the combining process. A molding compound having such a high bulk factor is difficult to mold. The size of the piece which can be molded, is governed by the size of the mold and the heat and pressure available in the press. To mold such compounds electro-statically without pre-forming them would be practically impossible.

It is, therefore, an object of this invention to provide a device which will reduce the bulk factor in a molding compound to a proportion that it can be efficiently molded with electro-static heat.

Another object of the invention is the provision of a device for pre-forming a high bulk factor molding compound into a much smaller mass of predetermined form.

Another object of the invention is the provision of a device of the character described, which will automatically measure and load a predetermined amount of high bulk factor molding compound, and will pre-form the same into a greatly reduced area.

Another object of the invention is the provision of a device of the character referred to which is entirely automatic in action and which is provided with means to progressively and positively control each operation in the cycle of the machine, upon the completion of another operation in its cycle.

Another object of the invention is the provision of a pre-forming machine, which is provided with means for selectively and progressively building up the pressures in its cycle of operation.

Another object of the invention is the provision of a device which will make possible the molding of compounds in comparatively small cavity molds.

Another object of the invention is the provision of a device for pre-forming molding compounds, whereby the loading of a mold is simplified by the use of a slug instead of a bulk charge.

Another object of the invention is the provision of a device which will assist in effecting an over all saving in the operation of a mold by making the material easier to handle.

Another object of the invention is the provision of a device which will automatically weigh and load a predetermined amount of material, and compress it accurately to a close tolerance, which is essential in an electro-static heating process.

A still further object of the invention is to make possible the wider use of superior types of material not used heretofore because of the difficulty in molding them.

A further object of the invention is the provision of an automatic pre-forming machine which will not jam in operation because one operation of its cycle must be completed before the next operation can start.

The foregoing and other objects and advantages of the invention will become more apparent as the description proceeds, reference being made from time to time to the accompanying drawings, forming part of this disclosure, in which:

Fig. 3 is a plan view of the compressing mold and associated parts.

Fig. 4 is a section taken substantially on the line 4—4 of Fig. 3.

Fig. 5 is a section taken substantially on the line 5—5 of Fig. 2.

Fig. 6 is a section taken substantially on the line 6—6 of Fig. 2.

Referring now more particularly to the drawings it will be understood that in the embodiment herein disclosed, my pre-forming machine generally consists of a weighing and loading mechanism, a compressing mechanism, and an automatic control system through which the other mechanisms are governed, as hereinafter described.

Figure 1:
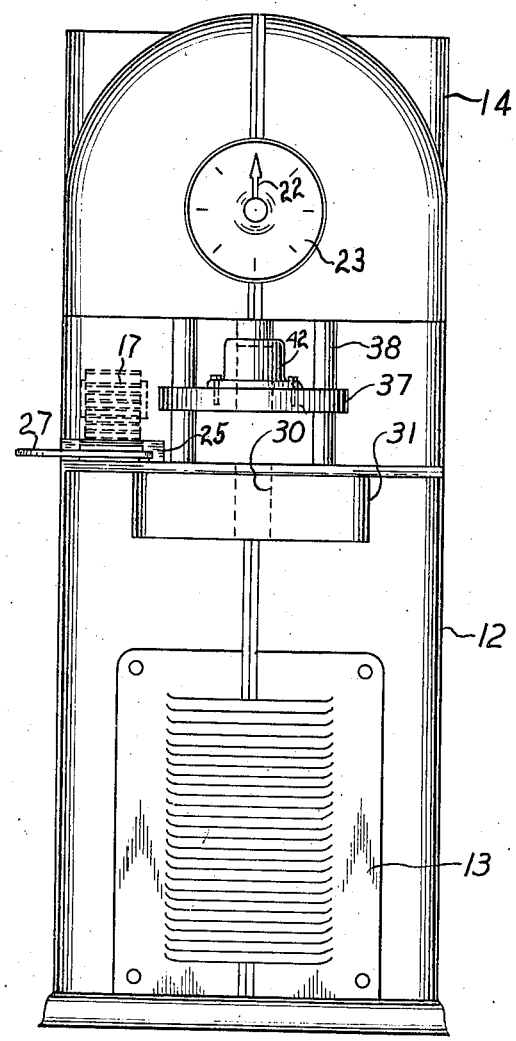
Fig. 1 is a front view of a device embodying my invention.

More specifically my device consists of a supporting frame 11, which may be a casting or other suitable fabrication, and which is enclosed in a housing 12 (Fig. 1), the front of which is provided with a louvered door 13. The frame 11, supports the principal working parts of the device as hereinafter described. I will now describe the working parts as closely as I can, in the order of their sequence of operation.

A hopper 14 is provided for the storage of a substantial quantity of molding compound, such as a treated and macerated canvas or the like, having a high bulk factor. Positioned in a suitable cutout in the base of the hopper 14, and driven by the motor 15, and belt 16, is an endless cleated belt 17, which is supported by suitable rollers 18, in the position shown in Fig. 2. The belt 17 is adapted to convey the material into the chute 19, which forms part of the hopper 14. The chute 19 is closed at the bottom by means of a counter-balanced tilt plate 20, which is pivoted, as at 21, so that it may be tilted into inclined position when a predetermined weight of material is deposited thereon. The tilt plate 20, is adjustably counter-balanced by means of a suitable weight, which is controlled by means of the indicator 22, positioned for rotation in front of the dial 23, and the linkage 24. After the material is weighed it is deposited by the tilt plate 20 in the loader 25, which is a suitable container open on the bottom, and slidably supported on the flush plate 26. The loader 25 is actuated by an arm 27, which is driven by a motor and reduction gear 28. The circuit operating the motor 28 is controlled by a switch 29, which in turn is actuated by the cylinder 8, the latter being in communication through pipes 8A and 8B with the control valve V, hereinafter more fully described. The loader 25 is adapted to transfer the molding material to the cavity 30 of the preform mold 31, which is formed with a fixed section 32 (Figs. 3 and 4) and a slidably movable section 33, which is actuated through the piston rod 34, and the tie members 35 and 36, by the cylinder 2, which is in communication with the valve V, through pipes 2A and 2B.

The top of the mold 31 is closed by the platen 37, which slides on the strain rods 38, which are secured at the top, by nuts 39, to the fixed platen 40, and at the bottom, by nuts 41, to the frame 11. The platen 37, has bolted to it a cell 42, which has a central opening 43, which communicates with a similar opening in the platen 37, and with the cavity 30 of the mold 31. The platen 37 is actuated by the piston rods 44, which are actuated by a pair of cylinders 1, which communicate with the valve V, through the pipes 1A and 1B.

Figure 2:
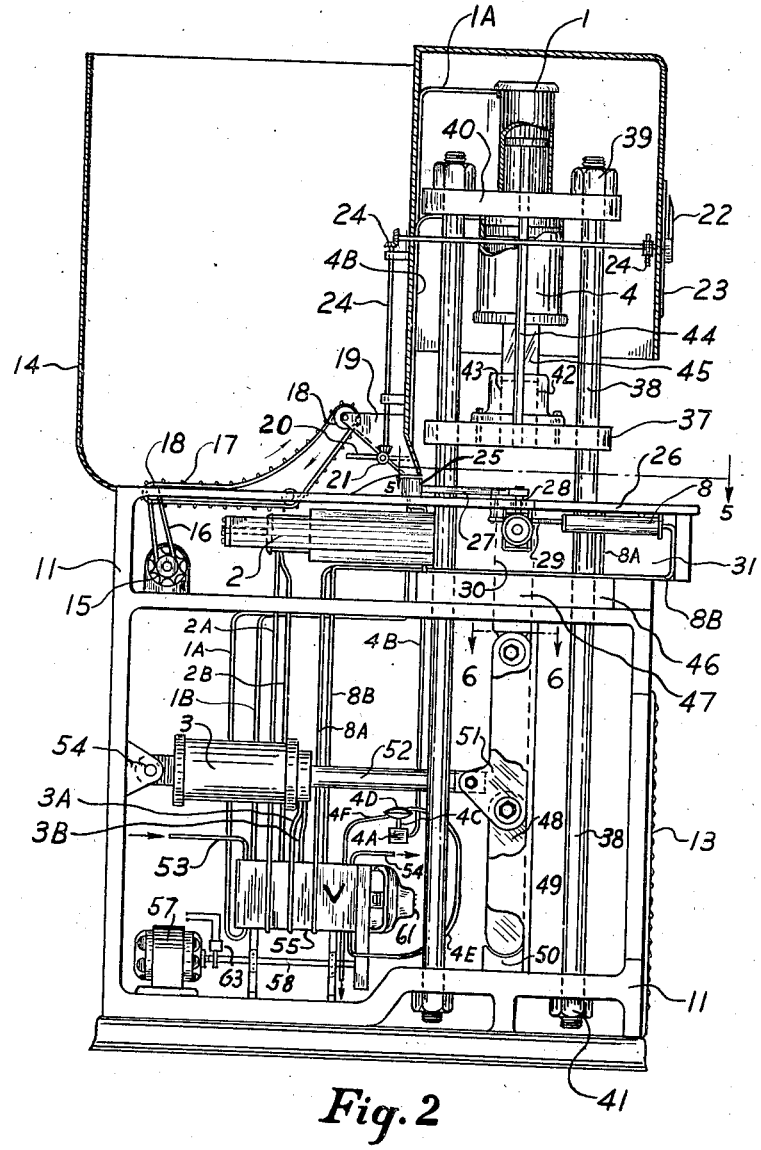
Fig. 2 is a left side view of the device illustrated in Fig. 1 with the cover removed, and with parts in section.

Depending from the platen 40 is a double acting high-pressure hydraulic cylinder 4, which communicates with the hydraulic valve 4A, through the pipe 4B. The valve 4A communicates through 4C, with a diaphragm 4D, which in turn communicates at top and bottom, through pipes 4E and 4F, with the main control valve V. The piston of the cylinder 4, carries the ram 45, which is adapted, when extended, to fill the openings in the cell 42 and platen 37. The ram 45 effects the final compression of the material and also serves as a stripper to remove the compressed plug from the cell 42 and platen 37, as the latter is raised in its return operation as described hereinafter. The plug is ejected from the machine by an arm 36A (Fig. 2) carried by the tie member 36. Positioned below the mold 31, and supported by the frame 11 and strain rods 38 is another platen 46 adapted to support the mold 31. Extending through a suitable opening in the platen 46, and into the mold cavity 30, is the ram 47, which is mounted on a toggle 48, which slides in a guide 49. The toggle 48 is of substantial cross section (Fig. 6) and when in its vertical position as shown in Fig. 2, will resist a pressure of many tons. The lower arm of the toggle 48 rests on a heel member 50 (Fig. 2). The toggle 48 connects through a suitable clevis 51, to the piston rod 52 of the cylinder 3, which communicates with the valve V through the flexible pipes 3A and 3B. The cylinder 3 is pivoted, as at 54, in a suitable bracket mounted on the frame 11.

It will be understood that the pistons in cylinders 1, 2, 3, and 4 are double acting and operate in both directions. It will also be understood that each piston actuates one or more electrical switches, as shown diagrammatically in Fig. 6, and as is described more fully hereinafter.

The valve V (Figs. 2 and 7) is connected to a suitable source of air supply 53 and finally exhausts through the pipe 54.

The valve V is a rotary valve comprising a housing 55 and a rotor 56, both of which are provided with suitable ports, which allow communication through the various pairs of pipes hereinabove described for operating the cylinders indicated.

Figure 7:
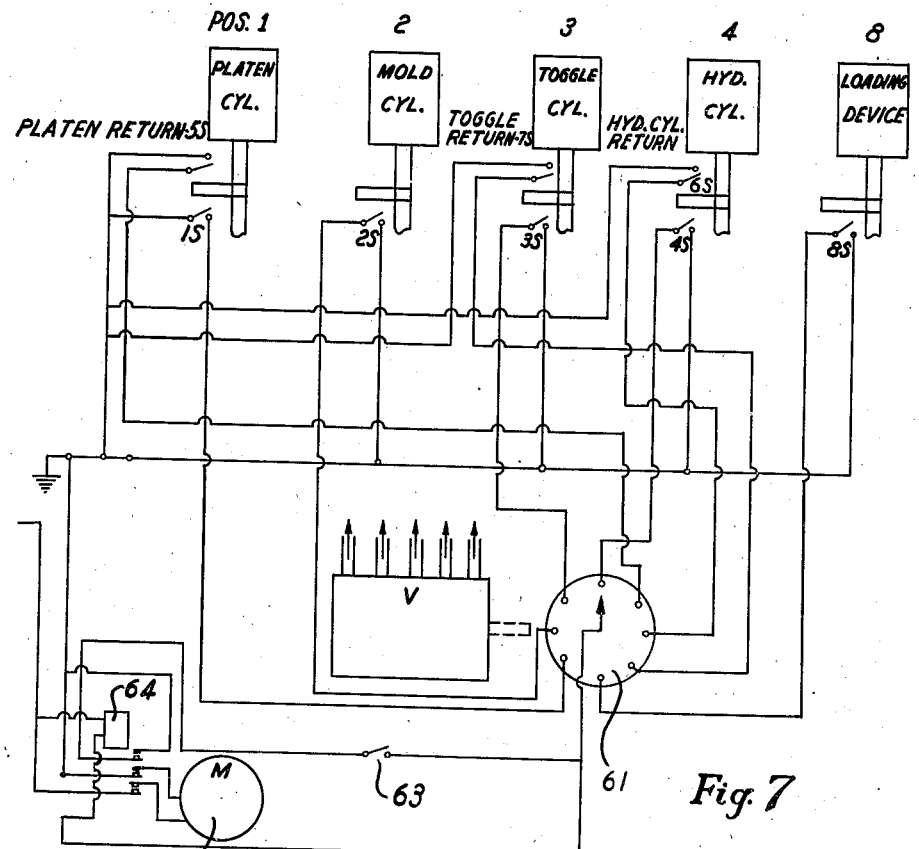
Fig. 7 is a diagrammatic sketch showing the electrical circuit and its relation to the other elements of the device.
Figure 8:
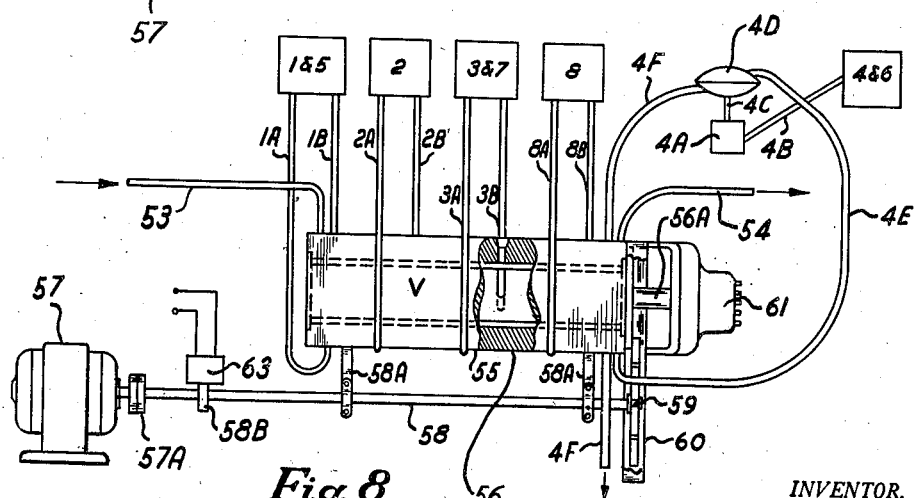
Fig. 8 is a diagrammatic view of the fluid system and controls comprising part of the device illustrated in Fig. 1.

For the purpose of this disclosure it will suffice to say that the rotor 56 of the valve V is driven by a motor 57, through a shaft 58, which is supported by bearings 58A, and a Geneva star and cam action 59, the latter being housed in a suitable housing 60. A timing device 61, magnetic switch 64, and a make and break switch 63, cam actuated by the shaft 58, all of which are connected in the circuit as shown in Fig. 7, complete the assembly. The make and break switch 63 opens the circuit on each revolution of the motor 57, and while it so remains open the circuit can only be closed through the timing device 61 as hereinafter described. As each operation of the machine cycle is completed one of the switches 1S to 8S is closed so that the motor 57 can operate to index the rotor 56 of the valve V to the next operating position. A typical operating cycle is now described.

The machine is first set to produce a pre-form of a given weight to a given thickness. This includes the setting of the weighing mechanism and adjusting the contact switch 4S on the hydraulic piston 4, for operation at a given stroke.

After the hopper 14 is filled with material, the conveyor belt 17, forming the bottom of the hopper, proceeds to load material on to the tilting plate 20, until the amount of material on the tilting plate 20 overbalances the adjustable weight, tripping a single pole double throw switch (not shown) which controls the conveyor motor 15, whereupon the conveyor 17 will stop. This double throw switch is in series with switch 29, hereinafter described. The circuit in which these switches are located is independent of the main control circuit shown in Fig. 7.

At this point the tilting plate 20 drops down, allowing the material to drop into the loading container 25. The tipping of the tilting plate 20 closes one side of the double throw switch indicated above and brings current to switch 29 at about the same time cylinder 3 opens, returning toggles 48 and ram 47, actuating the switch 7S indexing the valve V to the eighth position actuating the cylinder 8. The cylinder 8 closes the switch 29, which actuates the motor 28, causing the loading container 25 to move into position over the mold 31.

After hesitating over the mold 31 long enough to allow the material to drop into mold 31, the loading container 25 is returned to its original position. Upon the loading container 25 reaching its normal position it trips the switch 8S, restarting the motor 15, which drives the loading belt 17 and also trips the switch 8S, operating the valve motor 57, which drives the cam of the Geneva star and cam action 59, indexing the star to position 1, thus permitting air under pressure to flow through the valve V, into the top ends of the pair of cylinders 1, causing the platen 37 to move downwardly into contact with the top surface of the mold 31, thereby closing the top of the mold 31.

At the same time the valve V, through the pipe 1B and its exhausts ports, has allowed air to be exhausted from the bottom of the cylinders 1.

It will be understood that upon the completion of the operation just described, and each subsequent operation, the timer 61, controlling the multiple valve V, is indexed for the immediate succeeding operation, the timing and indexing operations being described more particularly hereinafter.

When the platen 37 reaches the limit of its downward movement, it trips the switch 1S, closing the circuit through the timer 61, indexing the multiple valve V, to its second position, still allowing pressure to be maintained in the cylinders 1, which actuates the platen 37, and bringing ports in the multiple valve V into position, permitting air under pressure to pass through the valve V and into pipe 2A, into the cylinder 2, which actuates the mold 31, at the same time bringing pipe 2B into communication with an exhaust port, allowing air on the opposite side of the piston in cylinder 2 to escape. The piston in cylinder 2 closes the mold 31, thereby compressing the material laterally into the cylindrical cavity 30 in a ratio of approximately 6 to 1. Upon the mold 31 completely closing it operates switch 2S, which indexes the multiple valve V, through the timer 61 to the third position, still maintaining pressure on both of the aforementioned cylinders 1 and 2, and allowing air under pressure to flow through valve V through pipe 3B, into the cylinder 3, operating the toggles 48, and forcing the lower ram 47 to the limit of its upward movement, thereby further compressing and forcing the material into the compression cell 42. Upon reaching the limit of its upward stroke, the ram 47 actuates the switch 3S, indexing the multiple valve V, through the timer 61, into the 4th position. This causes air pressure to be maintained in all three of the aforementioned cylinders 1, 2 and 3, also allows air to flow under pressure through pipe 3B, into the diaphragm 40 operating the hydraulic valve 4A, causing water or oil, under extremely high pressure, to flow into the hydraulic cylinder 4, thereby forcing the ram 45 to effect the final compression of the material. Upon the ram 45 reaching the bottom of its predetermined stroke, it operates a switch 4S, which indexes the multiple valve V, through the timer 61, to its 5th position, in which position pressure is still maintained on the mold cylinder 2, and toggle cylinder 3, but this time, air under pressure, is allowed to flow through pipe 1A, into the bottom end of the cylinders 1, at the same time allowing the top end of the cylinders 1, to exhaust through pipe 1B, thereby returning platen 37 to its top position. As the platen 37 moves upwardly, the upper ram 45 remains in position, which effects a stripping action, removing the compressed pre-form plug from the cell 42. At the same time the valve V has been brought into position allowing the diaphragm 40, on the hydraulic valve 4A to exhaust, bringing it to a neutral position. Upon the platen 37 reaching the top limit of its stroke it actuates the switch 5S, indexing the valve V to the 6th position, which allows air pressure to flow through the multiple valve V through pipe 2B, into the front end of mold cylinder 2, allowing the back end of the mold cylinder 2, to exhaust through pipe 2A, opening the mold 2 at the same time, and admitting air pressure through pipe 4F, to flow into the other side of the diaphragm 4D operating the hydraulic valve 4A, and returning the hydraulic ram 45 back to its top position.

Upon the hydraulic ram 45 reaching the top of its stroke, it trips the switch 6S, which indexes the multiple valve V to its 7th position, thereby admitting air under pressure to the pipe 3B, allowing air to flow to the front end of the toggle cylinder 3, also bringing ports in valve V into position to exhaust the back end of the toggle cylinder 3, into pipe 3A. The toggles 48, upon reaching the limit of their return stroke, actuate the switch 7S, again completing the circuit through the timer 61, and indexing the multiple valve V to its 8th position, actuating switch 29 bringing the motor 28, which drives the loading mechanism, again into operation, thus completing the cycle.

The timing action as effecting the indexing of the valve V is as follows: The multiple valve V, as heretofore mentioned, consists of a valve body proper 55, containing fixed ports and a rotating cylinder valve 56, containing adjustable ports. The movable cylinder 56, is rotated through eight fixed positions, by means of the Geneva star and cam movement 59, which is driven by the motor 57, through a suitable reduction gear 57A. Connected directly upon the shaft 56A of the valve rotor 56 is a timing device 61, having eight separate contacts, and a rotating brush (Fig. 7), completing the circuit through one contact at a time, from a central ring to one side of the power supply. This timer 61 is so adjusted that upon the completion of the indexing of the valve V for one position, the timer brush will have completed its part of the circuit, preparatory to the next operation of the valve V.

The operation of the valve motor 57 is as follows: The motor 57 is a single phase motor, driven through a standard three pole magnetic switch 64, of which two contacts form the motor circuit, and one contact completes the hold down circuit of the magnet. On the shaft 58, connecting the motor 57 to the Geneva cam 59, is placed a cam 58B, which at its highest position, breaks the circuit through the switch 63, which is normally closed. In operation when the proper switches 1S to 8S are actuated contact is made through the timer 61 to the magnetic switch causing it to close, operating motor 57, at the same time completing hold down circuit through switch 63. It will be noted that the valve V will index into the next position upon the completion of one-half of a revolution of the motor 57, thus advancing the timer 61 one position. This would break the circuit, and stop the motor 57 were the other switches 1S to 8S not in parallel with the timer 61. Upon the cam 58B completing its revolution however, it opens the switch 63, breaking the hold down circuit, thereby stopping motor 57 until another switch 1S to 8S in the next operation causes the valve cycle to function again.

Having described my invention what I claim and desire to secure by Letters Patent is:

1. In a preforming machine, means forming a closed cylindrical cavity comprising a cylindrical ram forming one end of said cavity, a pair of abutting members having an exposed end face, and semi-cylindrical side faces co-extensive in length and extending from said exposed end face to the end face of said ram to form the cylindrical wall of said cavity, one of said abutting members being fixed and the other retractable to enlarge said cavity into an open-ended receiving chamber, a superimposed removable capping means for said chamber comprising a first member having a wall portion engageable with the exposed face of said members for closing the open end of said receiving chamber and serving as a guide for said retractable member, said first member having a cylindrical bore therein in co-axial relationship with said cylindrical cavity and forming a continuation thereof upon movement of said capping means into capping position and a ram member closing the end of said bore, means for shifting said ram in the bore to react on material therein, and means to reversibly actuate said capping means to shift said wall portion to open the receiving chamber for material loading purposes and to close said chamber for material compressing purposes.

2. In a preforming machine, means forming a closed cylindrical cavity comprising a cylindrical ram forming one end of said cavity, a pair of abutting members having an exposed end face, and semi-cylindrical side faces co-extensive in length and extending from said exposed end face to the end face of said ram to form the cylindrical wall of said cavity, one of said abutting members being fixed and the other retractable to enlarge said cavity into an open-ended receiving chamber, a superimposed removable capping means for said chamber comprising a first member having a wall portion engageable with the exposed face of said members for closing the open end of said receiving chamber and serving as a guide for said retractable member, said first member having a cylindrical bore therein in co-axial relationship with said cylindrical cavity and forming a continuation thereof upon movement of said capping means into capping position and a ram member closing the end of said bore, means for shifting said ram in the bore to react on material therein, and means to reversibly actuate said capping means to shift said wall portion to open the receiving chamber for material loading purposes and to close said chamber for material compressing purposes, and means to sequentially actuate said retractable member, cylindrical ram and ram member to precompress, transfer and compress the material into said cylindrical bore.

3. In a preforming machine, the combination of a movable upper platen and a lower platen, said lower platen having a cylindrical precompressing chamber formed therein, a portion of the side wall of said chamber being formed by a member movable in said platen in flush relationship therewith, means to retract said member to enlarge said chamber into an open-ended receiving chamber, conveying means movable into position over the open end of said chamber for depositing material by gravity therein when the upper platen is moved to open the chamber, means to move said upper platen into abutting relation with said lower platen and retractable member to close said receiving chamber and act as a guide for said retractable member whereby upon advance of said retractable member the material will be confined and compacted into the precompression chamber, said upper platen having a final compression chamber in co-axial alignment with said precompression chamber, a ram closing one end of each of said co-axial chambers and disposed in axial alignment, and means for moving said rams in opposite directions to effect further compression of said material in the chambers.

4. A machine of the character described including means providing an elongated laterally opened precompression chamber formed by guiding side walls connected by a cross wall, a precompression plunger movable between said guide walls and closing the lateral opening of said chamber, a removable closure for the end opening of the chamber, means for delivering a charge of material to be operated upon through said end opening into the chamber when the closure is removed and the plunger retracted, said closure having a portion adapted to overlie the guide walls when in closed position and a portion recessed to provide a final compression chamber, means for sequentially actuating the closure and the precompression plunger to close and contract the precompression chamber, a second plunger, and means to actuate the second plunger to transfer and compress the charge from the precompression chamber into the final compression chamber.

5. A machine of the character described including means providing an elongated laterally opened precompression chamber formed by guiding side walls connected by a cross wall, a precompression plunger movable between said guide walls and closing the lateral opening of said chamber, a removable closure for the end opening of the chamber, means for delivering a charge of material to be operated upon through said end opening into the chamber when the closure is removed and the plunger retracted, said closure having a portion adapted to overlie the guide walls when in closed position and a portion recessed to provide a final compression chamber, means for sequentially actuating the closure and the precompression plunger to close and contract the precompression chamber, a second plunger, and means to actuate the second plunger to transfer and compress the charge from the precompression chamber into the final compression chamber, an additional plunger forming an end closure for the final compression chamber, and power means for moving the last named plunger relative to the final compression chamber in a direction to engage the compressed charge.

6. A machine of the character described including a charge determining device, an open-ended transfer mechanism, means for delivering a predetermined charge from the determining device to the transfer mechanism, means forming an elongated laterally opened precompression chamber, said means including guiding side walls and a cross connecting end wall, a precompression plunger movable between said guide walls in a direction toward said end wall and in all positions closing the lateral opening of said chamber, a removable closure for the end opening of the chamber, means for moving the transfer mechanism into alignment with the end opening of the chamber for deposit of the charge therein when the plunger is retracted, said closure having a portion adapted to overlie the guide walls when in closed position and a portion recessed to provide a final compression chamber, means for sequentially actuating the closure and the precompression plunger to close and contract the chamber, a second plunger, and means to actuate the second plunger to transfer and compress the charge from the precompression chamber into the final compression chamber.

7. In a preforming machine, the combination of means forming an elongated chamber having parallel walls and an integral cross connecting wall, a precompression plunger movable between said parallel walls toward and from said cross connecting wall, means closing one end of said chamber including a piston, separate means alternately movable into juxta-position with the opposite end of said chamber for material loading and chamber closing purposes respectively including an open-ended material conveying member adapted to receive material through one end and discharge it through the other end, means for loading a measured charge of material into said conveying member while said chamber is closed, said chamber closure means having a die cavity therein alignable with said piston upon closure of said chamber, and means to subsequently actuate said piston to transfer and compress a precompressed charge into said die cavity, and means to forcibly discharge the preform from said cavity.

GLEN E. KLINE.

REFERENCES CITED

The following references are of record in the file of this patent:

UNITED STATES PATENTS

| Number | Name | Date |
|---|---|---|
| 1,560,117 | Stevenson et al. | Nov. 3, 1925 |
| 1,995,131 | Reinhardt | Mar. 19, 1935 |
| 2,287,675 | Fair et al. | June 23, 1942 |
| 2,325,687 | Kux | Aug. 3, 1943 |
| 2,094,885 | Goss et al. | Oct. 5, 1937 |
| 2,120,943 | Schutz | June 14, 1938 |
| 1,573,565 | Mulligan | Feb. 16, 1926 |
| 1,269,769 | Whitney | June 18, 1918 |
| 1,404,441 | Keller | Jan. 24, 1922 |
| 2,290,626 | Bosomworth | July 21, 1942 |
| 2,347,971 | Sayre | May 2, 1944 |